(12) United States Patent
Mathiowetz et al.

(10) Patent No.: US 8,216,717 B2
(45) Date of Patent: Jul. 10, 2012

(54) HEAT FLOW REGULATING COVER FOR AN ELECTRICAL STORAGE CELL

(75) Inventors: Brad N. Mathiowetz, Lakeville, MN (US); Frank Kellershohn, Kerpen (DE); Joachim Düren, Köln (DE); Günter Kämper, Castrop-Rauxel (DE)

(73) Assignee: Fisher-Rosemount Systems, Inc., Austin, TX (US)

( * ) Notice: Subject to any disclaimer, the term of this patent is extended or adjusted under 35 U.S.C. 154(b) by 286 days.

(21) Appl. No.: 10/790,627

(22) Filed: Mar. 1, 2004

(65) Prior Publication Data

US 2004/0201363 A1    Oct. 14, 2004

Related U.S. Application Data

(60) Provisional application No. 60/509,050, filed on Mar. 6, 2003.

(51) Int. Cl.
*H01M 2/02* (2006.01)

(52) U.S. Cl. ........ 429/167; 429/149; 429/153; 429/158; 429/159; 429/163; 429/164; 429/175

(58) Field of Classification Search .................. 429/120, 429/167, 175
See application file for complete search history.

(56) References Cited

U.S. PATENT DOCUMENTS

| | | | |
|---|---|---|---|
| 1,387,619 A | 8/1921 | Rosenthal | 112/104 |
| 3,774,693 A | 11/1973 | Orthman | 172/311 |
| 3,955,132 A | 5/1976 | Greenwood | 323/15 |
| 4,290,647 A | 9/1981 | Hensel et al. | 397/362 |
| 4,337,516 A | 6/1982 | Murphy et al. | 364/551 |
| 4,535,636 A | 8/1985 | Blackburn et al. | 73/831 |
| 4,599,283 A * | 7/1986 | Thiele et al. | 429/99 |
| 4,630,265 A | 12/1986 | Sexton | 370/86 |
| 4,630,483 A | 12/1986 | Engdahl | 73/652 |
| 4,635,214 A | 1/1987 | Kasai et al. | 364/551 |
| 4,707,796 A | 11/1987 | Calabro et al. | 364/552 |
| 4,749,934 A | 6/1988 | Alexander et al. | 320/135 |
| 4,825,392 A | 4/1989 | Freeman | 324/142 |

(Continued)

FOREIGN PATENT DOCUMENTS

DE        295 14 362 U1    4/1996

(Continued)

OTHER PUBLICATIONS

International Search Report and Written Opinion for International Application No. PCT/US2004/006203, filed Mar. 1, 2004, date of mailing Sep. 8, 2004.

(Continued)

*Primary Examiner* — Ula C Ruddock
*Assistant Examiner* — Tony Chuo
(74) *Attorney, Agent, or Firm* — Westman, Champlin & Kelly, P.A.

(57) ABSTRACT

A temperature regulating cover for use on an electrical energy storage cell that may produce heat at a hot spot during a short circuit condition. The cover includes a first layer of thermally conductive material that is shaped to conform to an outer surface of the electrical energy storage cell and spreads heat from the hot spot over surface area that is larger than the hot spot. The cover also includes a second layer of thermally insulating material that is shaped to conform to an outer surface of the first layer and that retards heat flow to an outer surface of the second layer.

6 Claims, 4 Drawing Sheets

U.S. PATENT DOCUMENTS

| | | | | |
|---|---|---|---|---|
| 4,954,923 | A | 9/1990 | Hoeflich et al. | 361/111 |
| 4,964,125 | A | 10/1990 | Kim | 371/15.1 |
| 4,988,990 | A | 1/1991 | Warrior | 340/25.5 |
| 5,005,142 | A | 4/1991 | Lipchak et al. | 364/550 |
| 5,099,539 | A | 3/1992 | Forester | 15/143 |
| 5,103,409 | A | 4/1992 | Shimizu et al. | 364/556 |
| 5,113,303 | A | 5/1992 | Herres | 361/45 |
| 5,148,378 | A | 9/1992 | Shibayama et al. | 364/571.07 |
| 5,150,289 | A | 9/1992 | Badavas | 364/154 |
| 5,197,328 | A | 3/1993 | Fitzgerald | 73/168 |
| 5,204,194 | A * | 4/1993 | Miller et al. | 429/7 |
| 5,412,312 | A | 5/1995 | Crass et al. | 324/122 |
| 5,426,774 | A | 6/1995 | Banerjee et al. | 395/575 |
| 5,434,774 | A | 7/1995 | Seberger | 364/172 |
| 5,442,639 | A | 8/1995 | Crowder et al. | 371/20.1 |
| 5,469,156 | A | 11/1995 | Kogure | 340/870.38 |
| 5,471,698 | A | 12/1995 | Francis et al. | 15/144.1 |
| 5,481,200 | A | 1/1996 | Voegele et al. | 324/718 |
| 5,501,107 | A | 3/1996 | Snyder et al. | 73/862.23 |
| 5,570,300 | A | 10/1996 | Henry et al. | 364/551.01 |
| 5,573,032 | A | 11/1996 | Lenz et al. | 137/486 |
| 5,581,033 | A | 12/1996 | Hess | 73/431 |
| 5,598,521 | A | 1/1997 | Kilgore et al. | 395/326 |
| 5,623,605 | A | 4/1997 | Keshav et al. | 395/200.17 |
| 5,651,255 | A * | 7/1997 | Oweis et al. | 62/46.2 |
| 5,665,899 | A | 9/1997 | Willcox | 73/1.63 |
| 5,689,173 | A * | 11/1997 | Oosaki et al. | 429/7 |
| 5,697,453 | A | 12/1997 | Van Den Bosch | 172/41 |
| 5,742,845 | A | 4/1998 | Wagner | 395/831 |
| 5,752,249 | A | 5/1998 | Macon, Jr. et al. | 707/103 |
| 5,763,118 | A * | 6/1998 | Stafford et al. | 429/163 |
| 5,764,891 | A | 6/1998 | Warrior | 395/200.2 |
| 5,771,287 | A | 6/1998 | Gilley et al. | 713/191 |
| 5,793,963 | A | 8/1998 | Tapperson et al. | 395/200.31 |
| 5,828,567 | A | 10/1998 | Eryurek et al. | 364/184 |
| 5,838,187 | A | 11/1998 | Embree | 327/512 |
| 5,903,455 | A | 5/1999 | Sharpe et al. | 700/83 |
| 5,909,368 | A | 6/1999 | Nixon et al. | 364/131 |
| 5,923,557 | A | 7/1999 | Eidson | 364/471.03 |
| 5,940,290 | A | 8/1999 | Dixon | 364/138 |
| 5,956,663 | A | 9/1999 | Eryurek | 702/183 |
| 5,960,214 | A | 9/1999 | Sharpe, Jr. et al. | 395/835 |
| 5,970,430 | A | 10/1999 | Burns et al. | 702/122 |
| 5,980,078 | A | 11/1999 | Krivoshein et al. | 364/131 |
| 5,982,899 | A | 11/1999 | Probst | 713/1 |
| 5,985,480 | A * | 11/1999 | Sato et al. | 429/65 |
| 5,995,916 | A | 11/1999 | Nixon et al. | 702/182 |
| 6,007,944 | A * | 12/1999 | Bechtold et al. | 429/211 |
| 6,017,143 | A | 1/2000 | Eryurek et al. | 364/148.06 |
| 6,023,399 | A | 2/2000 | Kogure | 364/23 |
| 6,026,352 | A | 2/2000 | Burns et al. | 702/182 |
| 6,037,778 | A | 3/2000 | Makhija | 324/433 |
| 6,047,222 | A | 4/2000 | Burns et al. | 700/79 |
| 6,052,655 | A | 4/2000 | Kobayashi et al. | 702/184 |
| 6,087,036 | A * | 7/2000 | Rouillard et al. | 429/66 |
| 6,091,968 | A | 7/2000 | Koohgoli et al. | 455/557 |
| 6,094,600 | A | 7/2000 | Sharpe, Jr. et al. | 700/19 |
| 6,098,095 | A | 8/2000 | Nelson et al. | 709/208 |
| 6,111,738 | A | 8/2000 | McGoogan | 361/91.5 |
| 6,119,047 | A | 9/2000 | Eryurek et al. | 700/28 |
| 6,179,964 | B1 | 1/2001 | Begemann et al. | 162/198 |
| 6,192,281 | B1 | 2/2001 | Brown et al. | 700/2 |
| 6,195,591 | B1 | 2/2001 | Nixon et al. | 700/83 |
| 6,199,018 | B1 | 3/2001 | Quist et al. | 702/34 |
| 6,211,623 | B1 | 4/2001 | Wilhelm et al. | 315/224 |
| 6,236,334 | B1 | 5/2001 | Tapperson et al. | 340/825.37 |
| 6,263,487 | B1 | 7/2001 | Stripf et al. | 717/1 |
| 6,270,920 | B1 | 8/2001 | Nakanishi et al. | 429/163 |
| 6,294,287 | B1 * | 9/2001 | Lee et al. | 429/120 |
| 6,298,377 | B1 | 10/2001 | Hartikainen et al. | 709/223 |
| 6,304,934 | B1 | 10/2001 | Pimenta et al. | 710/129 |
| 6,307,483 | B1 | 10/2001 | Westfield et al. | 340/870.11 |
| 6,309,986 | B1 | 10/2001 | Flashinski et al. | 442/125 |
| 6,312,364 | B1 | 11/2001 | Selsam | 482/93 |
| 6,317,701 | B1 | 11/2001 | Pyotsia et al. | 702/188 |
| 6,324,607 | B1 | 11/2001 | Korowitz et al. | 710/102 |
| 6,325,611 | B1 * | 12/2001 | Iwasaki et al. | 425/164 |
| 6,356,191 | B1 | 3/2002 | Kirkpatrick et al. | 340/501 |
| 6,370,448 | B1 | 4/2002 | Eryurek | 700/282 |
| 6,377,859 | B1 | 4/2002 | Brown et al. | 700/79 |
| 6,397,114 | B1 | 5/2002 | Eryurek et al. | 700/51 |
| 6,434,504 | B1 | 8/2002 | Eryurek et al. | 702/130 |
| 6,444,350 | B1 | 9/2002 | Toya et al. | 429/90 |
| 6,449,574 | B1 | 9/2002 | Eryurek et al. | 702/99 |
| 6,455,186 | B1 * | 9/2002 | Moores et al. | 429/71 |
| 6,473,710 | B1 | 10/2002 | Eryurek | 702/133 |
| 6,487,462 | B1 | 11/2002 | Reeves | 700/73 |
| 6,505,517 | B1 | 1/2003 | Eryurek et al. | 73/861.08 |
| 6,519,546 | B1 | 2/2003 | Eryurek et al. | 702/130 |
| 6,532,392 | B1 | 3/2003 | Eryurek et al. | 700/54 |
| 6,539,267 | B1 | 3/2003 | Eryurek et al. | 700/51 |
| 6,539,384 | B1 | 3/2003 | Zellner et al. | 707/10 |
| 6,594,603 | B1 | 7/2003 | Eryurek et al. | 702/104 |
| 6,594,621 | B1 | 7/2003 | Meeker | 702/185 |
| 6,598,828 | B2 | 7/2003 | Fiebick et al. | 244/118.1 |
| 6,601,005 | B1 | 7/2003 | Eryurek et al. | 702/104 |
| 6,611,775 | B1 | 8/2003 | Coursolle et al. | 702/65 |
| 6,615,149 | B1 | 9/2003 | Wehrs | 702/76 |
| 6,629,059 | B2 | 9/2003 | Borgeson et al. | 702/183 |
| 6,654,697 | B1 | 11/2003 | Eryurek et al. | 702/47 |
| 6,656,145 | B1 | 12/2003 | Morton | 602/27 |
| 6,697,681 | B1 | 2/2004 | Stoddard et al. | 700/17 |
| 6,714,969 | B1 | 3/2004 | Klein et al. | 709/219 |
| 6,718,425 | B1 * | 4/2004 | Pajakowski et al. | 710/315 |
| 6,724,170 | B1 * | 4/2004 | Maggert et al. | 320/107 |
| 6,733,376 | B2 | 5/2004 | Williams | 451/344 |
| 6,748,631 | B2 | 6/2004 | Iguchi et al. | 24/265 |
| 6,775,271 | B1 | 8/2004 | Johnson et al. | 370/352 |
| 6,789,205 | B1 | 9/2004 | Patino et al. | 713/300 |
| 6,834,347 | B2 | 12/2004 | Goodman et al. | 713/191 |
| 6,851,612 | B2 | 2/2005 | Iasso et al. | 235/472.01 |
| 6,889,166 | B2 | 5/2005 | Zielinski et al. | 702/183 |
| 6,993,664 | B2 | 1/2006 | Padole et al. | 713/200 |
| 7,183,021 | B1 * | 2/2007 | Akashi et al. | 429/303 |
| 2001/0053065 | A1 | 12/2001 | Cudini et al. | 361/728 |
| 2002/0004370 | A1 | 1/2002 | Stengele et al. | |
| 2002/0049909 | A1 | 4/2002 | Jackson et al. | 713/188 |
| 2002/0065631 | A1 | 5/2002 | Loechner | |
| 2002/0077711 | A1 | 6/2002 | Nixon et al. | |
| 2002/0113685 | A1 * | 8/2002 | Izaki et al. | 337/405 |
| 2002/0116540 | A1 | 8/2002 | Maeda et al. | 709/317 |
| 2002/0123864 | A1 | 9/2002 | Eryurek et al. | |
| 2002/0149263 | A1 | 10/2002 | Blanco et al. | 307/64 |
| 2002/0167904 | A1 | 11/2002 | Borgeson et al. | 370/241 |
| 2002/0183863 | A1 | 12/2002 | Eryurek | 700/2 |
| 2003/0013009 | A1 * | 1/2003 | Dansui et al. | 429/120 |
| 2003/0017383 | A1 * | 1/2003 | Ura et al. | 429/120 |
| 2003/0023408 | A1 | 1/2003 | Wight et al. | |
| 2003/0023795 | A1 | 1/2003 | Packwood et al. | |
| 2003/0033040 | A1 | 2/2003 | Billings | 700/97 |
| 2003/0046974 | A1 * | 3/2003 | Kosh | 73/1.57 |
| 2003/0058277 | A1 | 3/2003 | Bowman-Amuah | 345/764 |
| 2003/0119568 | A1 | 6/2003 | Menard | 455/572 |
| 2003/0158795 | A1 | 8/2003 | Markham et al. | |
| 2003/0204373 | A1 | 10/2003 | Zielinski et al. | 702/184 |
| 2004/0039458 | A1 | 2/2004 | Mathiowetz et al. | 700/17 |
| 2004/0148503 | A1 | 7/2004 | Sidman | 713/167 |
| 2004/0172526 | A1 | 9/2004 | Tann et al. | 713/2 |
| 2004/0225796 | A1 | 11/2004 | Hanson et al. | 710/301 |
| 2004/0230327 | A1 | 11/2004 | Opheim et al. | 700/83 |
| 2004/0230899 | A1 | 11/2004 | Pagnano et al. | 715/513 |
| 2004/0248619 | A1 | 12/2004 | Graiger et al. | 455/566 |
| 2005/0036372 | A1 | 2/2005 | Sasaki | 365/202 |
| 2006/0094466 | A1 | 5/2006 | Tran | 455/558 |

FOREIGN PATENT DOCUMENTS

| | | |
|---|---|---|
| DE | 29917651 | 12/2000 |
| DE | 1993 0660 A1 | 1/2001 |
| DE | 101 29 189 | 6/2001 |
| EP | 0177225 * | 9/1985 |
| EP | 633 420 A2 | 10/1993 |
| EP | 676 818 B1 | 7/1999 |
| EP | 1022626 A2 | 7/2000 |
| GB | 1387619 | 5/1972 |
| GB | 1 387 619 | 3/1975 |
| GB | 2347232 | 8/2000 |
| JP | 2753592 | 1/1990 |

| | | | |
|---|---|---|---|
| JP | 11-501447 | | 2/1999 |
| JP | 2000-294301 | | 10/2000 |
| JP | 2001-070224 | | 3/2001 |
| JP | 2001-243927 | * | 9/2001 |
| JP | 2007-70224 | | 3/2007 |
| WO | WO/96/12993 | | 5/1996 |
| WO | WO 96/17397 | | 6/1996 |
| WO | WO/97/21157 | | 6/1997 |
| WO | WO 98/14855 | | 4/1998 |
| WO | WO/98/39718 | | 9/1998 |
| WO | WO/00/41050 | | 7/2000 |
| WO | WO 00/55700 | | 9/2000 |
| WO | WO 01/80331 A1 | * | 10/2001 |
| WO | WO 01/02891 A2 | | 11/2001 |
| WO | WO/02/27418 | | 4/2002 |
| WO | WO 02/077732 | | 10/2002 |

OTHER PUBLICATIONS

Office Action for Application No. 200480004934.7 dated Dec. 8, 2006.
Factory Mutual Research Corporation. *Approval Standard*, "Intrinsically Safe Apparatus and Associated Apparatus for Use in Class I, II, and III Division 1 Hazardous (Classified) Locations." Oct. 1988.
Office Action from corresponding Japanese Application Serial No. 2006-508953, dated Dec. 1, 2010.
The Examination Report from Application No. 04252805.9, filed May 14, 2002.
The first Communication from Application No. 05826038.1, filed Nov. 9, 2005.
Office Action from Chinese Application No. 200410042268.8, dated Dec. 14, 2007.
Second Office Action from Chinese Application No. 200410042268.8, dated Jul. 25, 2008, 8 pgs.
Product Data Sheet: Asset Management Solutions—HART Communicator, Jan. 2001, Retrieved from the Internet on Dec. 17, 2007: <URL: http://www.peabprocess.se/Template/send_file_pr.asp?ID=196>.
The Chinese OA in foreign application No. 200410043322.0, filed May 14, 2004.
Schneier, "Applied Cryptography," 1996, John Wiley & Sons, $2^{nd}$ Edition, pp. 30-31.
"Panasonic Makes SD Technology More Accessible and Affordable," PR Newswire, Jul. 2001 Retrieved from the Internet on Dec. 15, 2006, http://proquest.umi.com/pqdweb?did=75198117&sid=3 &Fmt=3&clientld=19649&RQT-309&Vname=PQD.
Kaufman et al., "Network Security—Private Communication in a Public World," 1995, Prentice Hall PTR, pp. 53-55.
U.S. Office Action from related U.S. Appl. No. 10/790,627, dated Feb. 20, 2008.
"Field Device Integration" by Prof. Dr.-Ing. Habil. Peter Neumann, Dipl.-Ing. Rene Simon; Prof. Dr.-Ing. Christian Diedrich, Dipl.-Inf. Matthias Riedl; Institut fur Automation und Kommunikation e. V. (ifak) Steinfeldstrasse 3 (IGZ), D-39179 Barleben, Germany; 2001, pp. 63-68.
EPO Communication from EP Application No. 04 252 805.9-2006; May 17, 2006, 3 pages.
European Patent Office Search Report for Application No. 04252479.3-2415, Jul. 27, 2007, 3 pages.
"Managing Power and Performance for System-in-Chip Designs using Voltage Islands" by Lacket et al., 0-7803-7607-2/02/$17.00 © 2002 IEEE, pp. 195-202.
Third Office Action from related application Chinese Application No. 200410042268.8, dated Jan. 16, 2009.
Office Action from the European Patent Office for Application No. 04252479.3-2415, Reference No. P71947EP00, date Oct. 29, 2007; 5 pages.
"Rethink Instrument Specifications when Specifying Fieldbus Devices", Stewart, Sep. 1999, 1 page.
"Technical Information", Sam, Jun. 1999, Samson AG, L452&L454; Dec. 1999 pp. L452(1-40) and L454(1-42).
U.S. Appl. No. 09/384,876, filed Aug. 27, 1999, Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/852,102, filed May 9, 2001, Eryurek et al.
U.S. Appl. No. 09/855,179, filed May 14, 2001, Eryurek et al.
U.S. Appl. No. 10/790,627, filed Mar. 6, 2003, Mathiowetz.
U.S. Appl. No. 10/438,386, filed Mar. 1, 2004, Mathiowetz et al.
U.S. Appl. No. 10/440,047, filed May 16, 2003, Kantzes et al.
U.S. Appl. No. 10/426,894, filed Apr. 30, 2003, Duren et al.
U.S. Appl. No. 10/438,401, filed May 16, 2003, Opheim et al.
U.S. Appl. No. 10/440,434, filed May 16, 2003, DelaCruz et al.
U.S. Appl. No. 10/435,819, filed May 12, 2003, Kantzes et al.
U.S. Appl. No. 10/440,048, filed May 16, 2003, Duren et al.
U.S. Appl. No. 10/440,444, filed May 16, 2003, Mathiowetz et al.
U.S. Appl. No. 10/439,660, filed May 16, 2003, Mathiowetz et al.
U.S. Appl. No. 10/439,764, filed May 16, 2003, Mathiowetz.
U.S. Appl. No. 10/310,703, filed Dec. 5, 2002, Zielinski et al.
U.S. Appl. No. 10/440,041, filed May 16, 2003, Mathiowetz et al.
U.S. Appl. No. 10/440,441, filed May 16, 2003, Mathiowetz et al.
"Fluke 179 Multimeter & ToolPak Combo Pack,"http://www.fluke.com/MULTIMETER/TOOLPAK .ASP?AGID=6&SID=260 (2 pages), May 5, 2003.
"Multifunction PDA Calibrator Transmation Model 3-PMF1," Transmation, Apr. 2001.
"AAPA 60 & 90 Series Multimeter," http://www.appatech.com/a-60new.htm (5 pages), May 5, 2003.
"Fieldbus Standard for Use in Industrial Control System Part 2: Physical Layer Specification and Service Definition", ISA-S50.02-1992, pp. 1-93, 1992.
Hart Communications, Technical Information, Part 4 Communications, Samson, Frankfurt, 1999.
"Fieldbus Brings Protocol to Process Control," Santori et al., IEEE Spectrum, vol. 33, Issue 3, Mar. 1996, pp. 60-64.
"Computerized Maintenance systems—an Overview of Two Basic Types for Field Devices," Medlin, IEEE Pulp and Pater Industry Technical Conference, Jun. 21-25, 1999, pp. 230-232.
"Fieldbus in the Process Control Laboratory—its Time has Come," Rehg. et al., ASEE/IEEE Frontiers in Education Conference, vol. 3, Nov. 1999, pp. 13B4/12-13B4/17.
"Generic Device Description for Complex HART Field Devices," Zulkifi et al., IEE $8^{th}$ International Conference on Communication Systems, vol. 2, Nov. 25-28, 2002, pp. 646-650.
"SFC Smart Field Communicator—Model STS103," Honeywell, Specification, Dec. 1995, pp. 1-4.
"SFC Smart Field Communicator—Models SFC160/SFC260," Yamatake, Specification Apr. 1999, pp. 1-6.
"HART Communicator," Fisher-Rosemount, Product Manual, Jul. 2000 pp. i-iv, ix-x, 1-1-1-40—2-1-2-8—3-1-3-38—A-1-A-6—B-1-B-6 C-1-C-4—D-1-D-4 and I-1 1-2.
Shoji et al., Fieldbus System Engineering, 1999, Yokogawa Technical Report.
Diedrich et al., Field Device Integration in DCS Engineering Using a Device Model, 1998, IEEE.
Dewey, Fieldbus Device Maintenance—Do I Need to Go to the Field Anymore?, The Instrumentation, Systems and Automation Society, ISA 2000, Copyright 2000.
Simon et al., Field Devices—Models and their Realisations, Dec. 11-14, 2002, Industrial Technology, IEEE ICIT 2002, IEEE International Confererence, vol. 1, pp. 307-312.

* cited by examiner

HEAT FLOW REGULATING COVER FOR AN ELECTRICAL STORAGE CELL

The present application is based on and claims the benefit of U.S. provisional patent application Ser. No. 60/509,050, filed Mar. 6, 2003, the content of which is hereby incorporated by reference in its entirety.

FIELD OF THE INVENTION

The invention relates to equipment for use in hazardous industrial locations where intrinsically safe (IS) electrical equipment is required. In particular, the present invention relates to providing intrinsic safety for electrical energy storage cells.

BACKGROUND OF THE INVENTION

In the process automation industries, it is common to have processes that are hazardous. In order to prevent accidents caused by equipment faults, independent agencies certify equipment as intrinsically safe (IS). The premise of this certification is that under no conditions could an equipment fault occur that would discharge enough energy to ignite a hazardous gas, dust or liquid. As battery technologies advance, battery cells are capable of storing increasing amounts of energy in the same package size. This creates a dichotomy for portable, battery powered, intrinsically safe equipment. One of the tests certification agencies use to approve batteries is the short circuiting of the battery and measurement of its surface temperature. There are various temperature classifications, but no spot on the battery surface can exceed the limit of the classification. For example, a T4 classification has a limit of 130 degrees C. Modern batteries typically fail this test and exceed the maximum permitted temperature for the T4 classification.

A method and apparatus are needed to adapt energy storage cells and batteries for use in hazardous industrial locations where intrinsic safety standards must be met.

SUMMARY OF THE INVENTION

Disclosed is a temperature regulating cover for use on an electrical energy storage cell that may produce heat at a hot spot during a short circuit condition. The cover includes a first layer of thermally conductive material that is shaped to conform to an outer surface of the electrical energy storage cell and spreads heat from the hot spot over surface area that is larger than the hot spot. The cover also includes a second layer of thermally insulating material that is shaped to conform to an outer surface of the first layer and that retards heat flow to an outer surface of the second layer.

DETAILED DESCRIPTION OF THE ILLUSTRATED EMBODIMENTS

In the embodiments described below, an electrical energy storage cell may produce heat at a hot spot during a short circuit condition. The hot spot has a surface temperature that exceeds intrinsic safety (IS) temperature limits and has the potential to ignite gas, dust or flammable liquid in an industrial environment, such as an oil refinery. A heat regulating cover is provided to overcome this problem.

The cover includes a first layer of thermally conductive material that spreads flow of the heat from the hot spot over a portion of the outer surface of the first layer that is larger than the hot spot. A second layer of insulating material covers the heat conducting layer and retards flow of the heat to an outer surface of the second layer. The outer surface of the covered energy storage cell is below a temperature which can cause combustion.

The covered cell can be used in an application where intrinsic safety is required, such as a battery used to energize a hand-held portable instrument such as a data acquisition unit or a calibrator.

Figure 1:
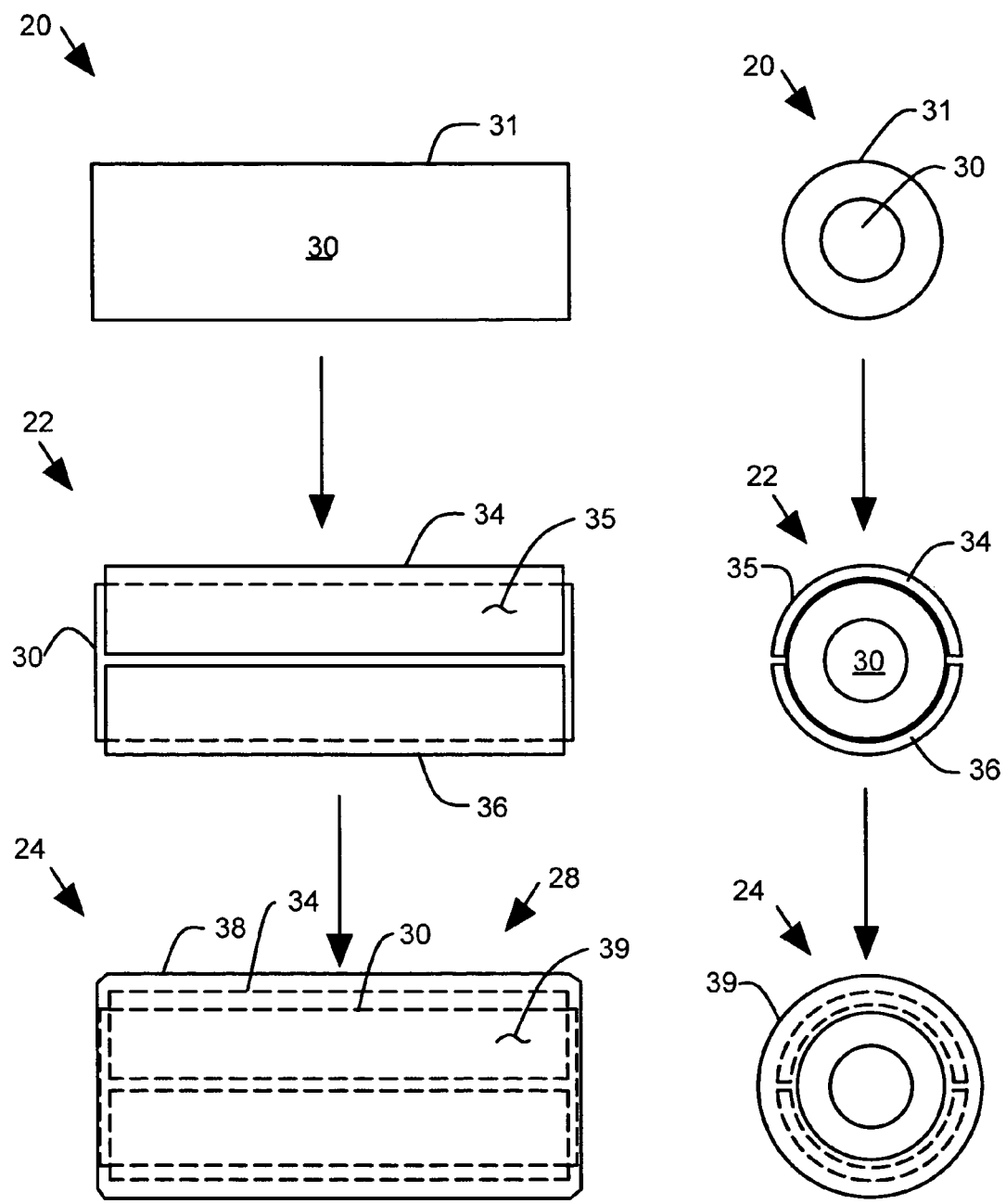
FIG. 1 illustrates process steps in assembling a heat flow regulating cover on an electrical energy storage cell.

FIG. 1 illustrates process steps 20-24 in assembling an exemplary heat flow regulating cover 28 on an electrical energy storage cell 30 that can produce heat during a short circuit test interval.

At first process step 20, a cell 30 is selected that has a high energy storage density to provide long battery life. The cell 30 has a cylindrical outer surface 31 that can produce hot spots under short circuit conditions. In one example, the cell 30 can be a size AA cell with a diameter of approximately 16 mm and a length of approximately 40 mm. Other size cells can be used, and cells can be either disposable cells or rechargeable cells.

At second process step 22, a first layer of material 34, 36 is assembled over the cylindrical outer surface 31. The first layer of material 34, 36 has a high specific heat capacity and is thermally conductive. In one example, the first layer of material includes a first half shell 34 and a second half shell 36 that are shaped to conform with the cylindrical outer surface 31. The first layer of material 34, 36 covers the outer surface 31.

At third process step 24, a second layer of material 38 is provided. The second layer of material 38 is thermally insulating. The second layer of material 38 is shaped to conform to an outer surface 35 of the first layer of material 34. The second layer of material 38 is preferably elastic and shrunk to hold the first layer of material 34, 36 firmly in place against the cylindrical outer surface 31 of the cell 30. The use of elastic material for the second layer of material 38 avoids a problem with gaps forming that would interfere with heat flow. The second layer of material 38 is preferably commercially available heat shrink tubing formed of rubber or thermoplastic material. In one embodiment, the layer of material 38 has a thickness of about 1 mm.

Figure 3:
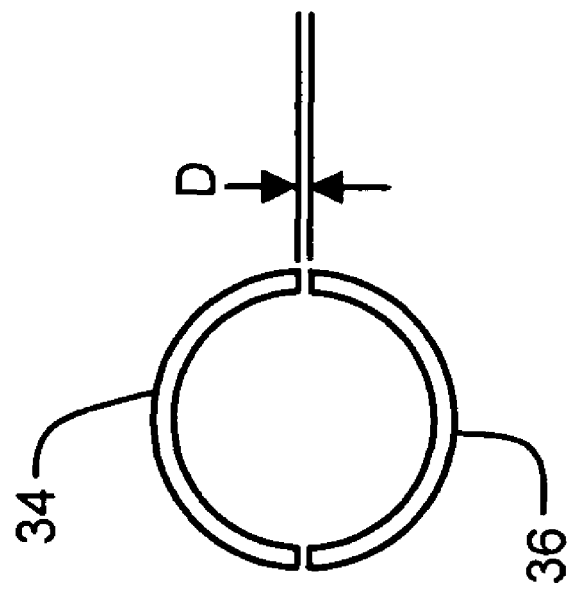
FIGS. 2-3 illustrate front and left side views of two half shells that form a thermally conductive layer.
Figure 2:
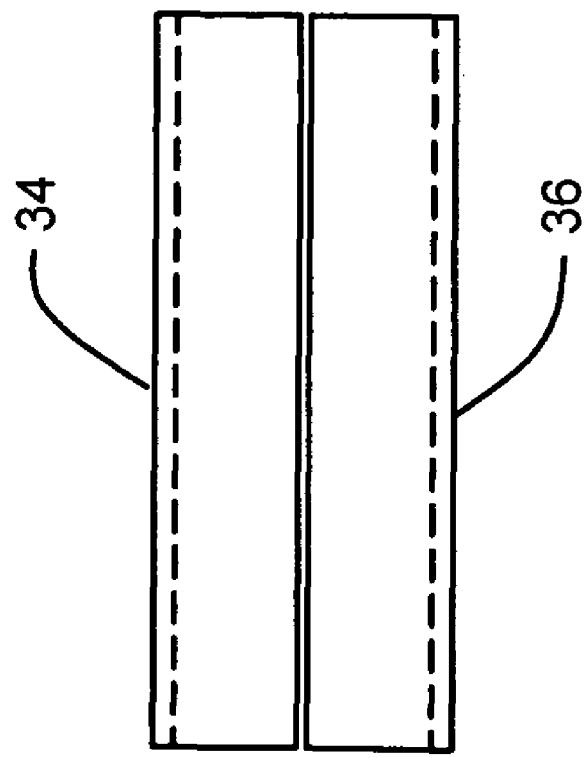

FIGS. 2-3 illustrate front and left side views of the two half shells 34, 36 that together form the high conductivity layer. Each half shell 34, 36 has an approximately semi-cylindrical shape that is sized to conform to the outer surface 31 of the cell 31. A small gap D is left between the half shells 34, 36 to encourage a good fit and good thermal contact between the cell 31 an the half shells 34, 36. The small gap D can be on the order of about 0.8 mm and can be selected to allow space for thermal expansion of the half shells 34, 36 at higher temperatures. The half shells 34, 36 are preferably formed from aluminum tubing having a wall thickness of about 1 mm. Aluminum has a thermal conductivity of about $4.9 \times 10^{-2}$ (Kcal/sec)/(meter$^2$) (degree C./meter), and aluminum has a specific heat of about 0.219 cal/(gram) (degree C). The half shells 34, 36 can also be made from copper. Copper has thermal conductivity of about $9.2 \times 10^{-2}$ (Kcal/sec)/(meter$^2$) (degree C./meter), and copper has a specific heat of about 0.093 cal/(gram)(degree C.). Other materials with appropriate thermal conductivity may also be used.

When there is a hot spot on the surface 31 of cell 30, the first layer of material 34, 36 spreads flow of the heat from the hot spot over a portion of the outer surface of the first layer 34 that is larger than the hot spot, while the second layer 38 of material retards flow of heat to an outer surface 39 of the second layer 38.

In one embodiment, the thicknesses of the layers 34, 36, 38 are adjusted so that a temperature of the outer surface of the second layer 38 has a measured maximum temperature of 130 degrees centigrade or less during the short circuit test interval. The thicknesses of the layers 34, 36, 38 can be selected by using thermal finite element analysis (FEA), by thermal testing, or a combination of thermal FEA and thermal testing.

Figure 4:
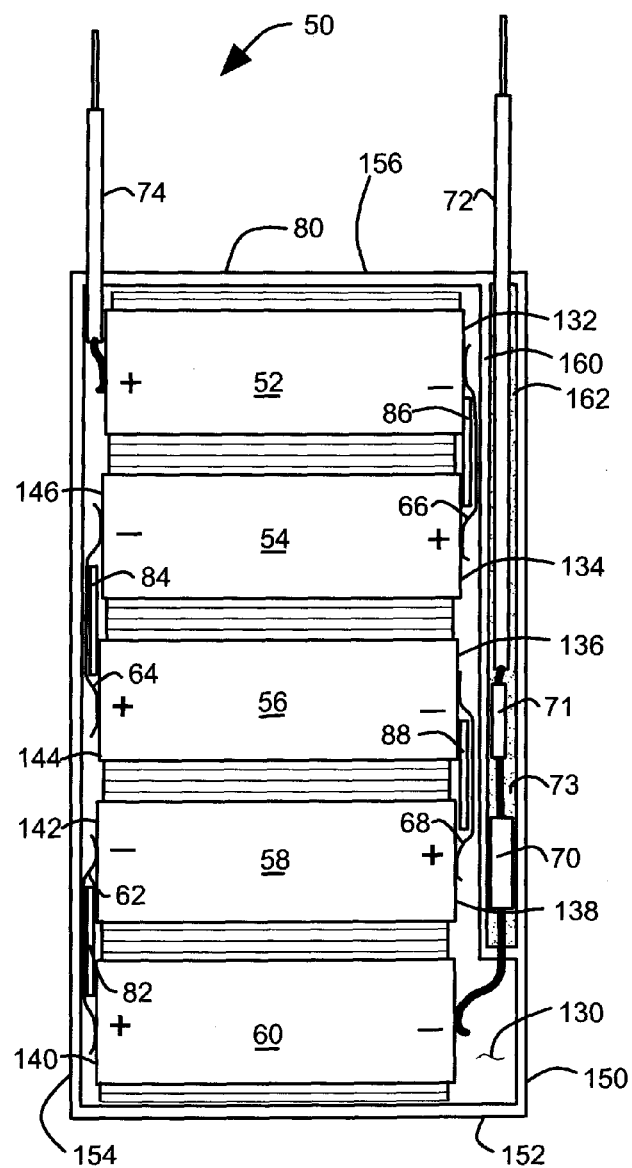
FIG. 4-5 illustrate a battery that includes a plurality of covered electrical energy storage cells.
Figure 5:
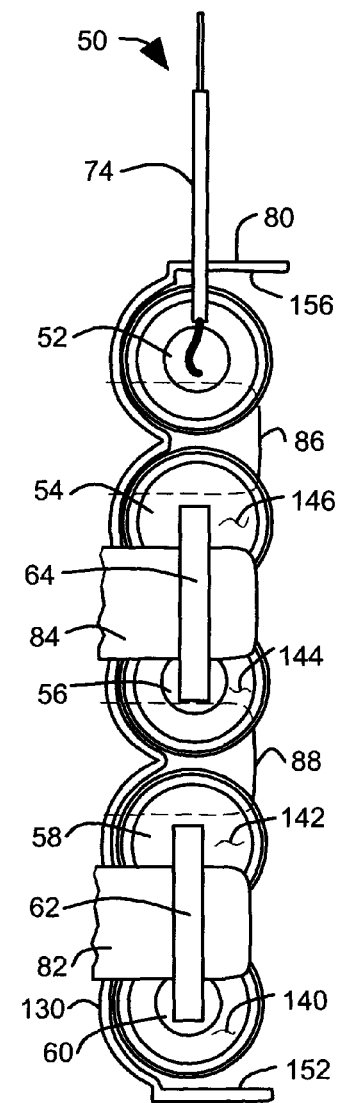

FIG. 4-5 illustrate one example of a battery 50 that includes a plurality of covered electrical energy storage cells 52, 54, 56, 58, 60. FIG. 4 is a plan view of the battery and FIG. 5 is a left side view of a portion of the battery. The battery 50 is arranged for use in a combustible atmosphere.

The plurality of electrical energy storage cells 52, 54, 56, 58, 60 are each covered with a heat regulating cover as described above in connection with FIGS. 1-3. Electrical interconnections 62, 64, 66, 68 are metal strips that are spot welded to the cells 52, 54, 56, 58, 60 to form a series circuit. A protective device 70 is connected in series between cell 60 and a negative polarity electrical connection lead 72. The protective device 70 is connected by a crimped splice 71 to electrical connection lead 72. The electrical connection lead 72 and the protective device 70 are secured in place by a potting compound 73. A positive polarity electrical connection lead 74 is connected to the cell 52.

The protective device 70 preferably comprises a fusible link, and in particular a PICO Fuse part number 265002 can be used. During short circuit testing, the protective device 70 can be bridged (temporarily short circuited) to simulate a fault condition.

The cells 52, 54, 56, 58, 60, the protective device 70, the interconnections 62, 64, 66, 68 and the leads 72, 74 are placed in a plastic resin shell 80 that includes a bottom shell portion 130 shaped to provide mechanical support. The shape of the bottom shell portion 130 disposes the cells 52, 54, 56, 58, 60 side by side and spaced apart from each other. The plastic resin shell 80 includes plastic resin separation bars 82, 84, 86, 88 positioned between cell end portions 132, 134, 136, 138, 140, 142, 144, 146 of the cells 52-60 and the electrical interconnections 62-68 to reduce shorting and provide additional mechanical support. The plastic resin shell 80 includes peripheral shell sidewalls 150, 152, 154, 156 that extend from the bottom shell portion 130 to surround the cells 52-60, the electrical interconnections 62, 64, 66, 68 and the protective device 70. The plastic resin shell 80 includes an interior wall 160 that forms a side of a channel 162 in which the protective device 70 and the potting compound 73 are disposed.

Figure 8:
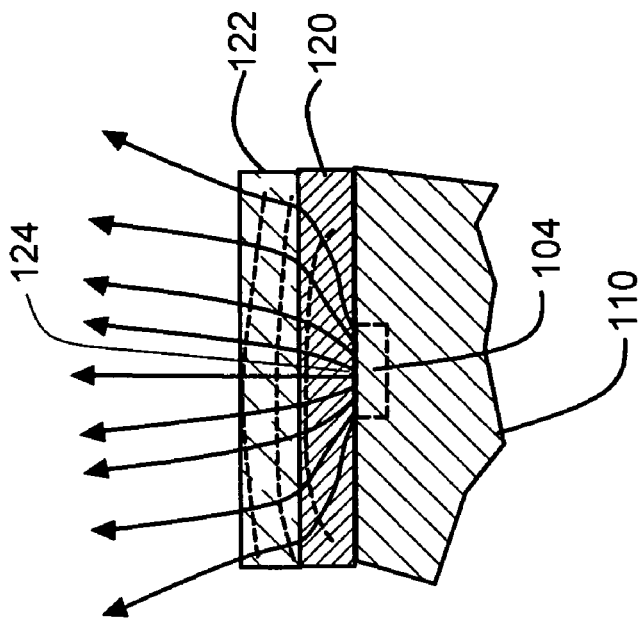
FIG. 6-8 illustrate heat flows from hot spots on outer surfaces of electrical energy storage cells.
Figure 7:
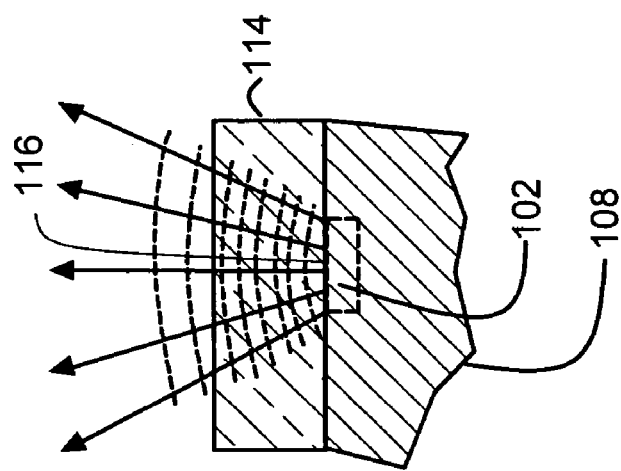
Figure 6:
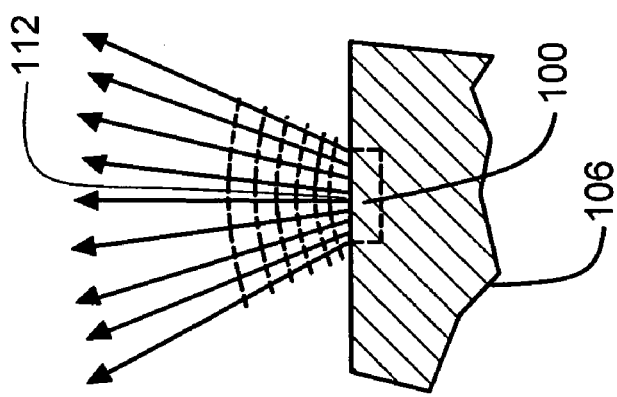

FIG. 6-8 illustrate heat flows from hot spots 100, 102, 104 on outer surfaces of electrical energy storage cells 106, 108, 110 respectively. In FIGS. 6-8, the flow of heat is illustrated schematically with arrows, and temperature isotherms are illustrated schematically with dashed lines.

In FIG. 6, the hot spot 100 on the cell 106 is left uncovered and a temperature at the outer surface 112 of the cell 106 exceeds 130 degrees Centigrade during a short circuit test. The uncovered cell 106 is unsuitable for use in an industrial environment where intrinsic safety (IS) approval rating is required. The outer surface of cell 106 has a hot spot 100 that is hot enough to ignite combustibles.

In FIG. 7 a hot spot 102 on a cell 108 is covered with thermally insulating material 114. The surface temperature at the outer surface 116 of the insulating material remains below 130 degrees during a short circuit test, however, the hot spot 114 is insulated to such an extent that it overheats and permanently damages the cell 108, thus proving to be unsuitable for use in an intrinsic safety environment.

In FIG. 8, the hot spot 104 is covered with a first layer 120 of thermally conductive material and a second layer 122 of thermally insulating material as described above in connection with FIGS. 1-3. The first layer 120 spreads the heat flow from the hot spot 104 over a larger surface area as illustrated. The heat flow per unit area of surface is reduced. The heat flow spreads both along the axis of the cell and circumferentially so that the area available for heat flow is substantially enlarged. The thermally insulating layer 122 limits heat flow and further encourages spread of heat through the thermally conducting layer 120. The temperature at external surface 124 remains below 130 degrees Centigrade, however, the heat is well dissipated because it is conducted over a large area. The cell 110 is not excessively heated, and the cell 110 can be used in an intrinsically safe environment.

"Hot spots" which occur on the battery surface during the short circuit test are effectively shielded from contact with combustibles. The first thermally conductive layer, in close contact, surrounds the cell with material that has high thermal conductivity. This layer distributes the thermal energy of the "hot spots" onto a larger surface area and thereby reduces the maximum surface temperature. The second layer, in close contact, encases the first layer of material. The second layer of material has a low thermal conductivity coefficient. This material acts as a thermal insulator between the first layer and the ambient atmosphere. The value of thermal conductivity of each layer is such that the surface temperature of the second layer of material is below the required value of the desired temperature classification.

High-energy density batteries can be used in hazardous areas of the zones 1 and 2 for the temperature classes T1 to T4 using the cover arrangement described. The cover can be used on rechargables batteries as well as for disposable batteries. Modern batteries with larger internal capacities can be used with the invention. These modern batteries include cells that reach higher surface temperatures at the short-circuit tests than is allowed for the approval. The cover regulates the heat flow and provides a solution to this problem for batteries with large internal capacity. While a series arrangement of cells has been illustrated, it will be understood by those skilled in the art that a parallel arrangement of cells can also be used.

Although the present invention has been described with reference to preferred embodiments, workers skilled in the art will recognize that changes may be made in form and detail without departing from the scope of the invention.

What is claimed is:

1. A temperature regulated, enclosed intrinsically safe electrical energy storage cell pack for an intrinsically safe hand held portable instrument in an industrial process control system, comprising:
   a plurality of electrical energy storage cells wherein the electrical energy storage cells are elongate and aligned parallel to one another and side by side;
   a plurality of opposed alternating electrical interconnects arranged to electrically connect ends of adjacent pairs of electrical energy storage cells;
   electrical leads which couple the plurality of electrical energy storage cells to the intrinsically safe hand held instrument;

a plurality of elongated separation bars positioned at the ends of pairs of adjacent electrical energy storage cells and between the plurality of electrical interconnects to thereby reduce shorting and provide mechanical support;

a plurality of opposed first and second half shells forming a plurality of half shell pairs, each half shell pair having a tubular shape and positioned in physical contact with opposing sides of one of the plurality of electrical storage cells, each half shell pair having a gap between opposed adjacent edges of each half shell pair and extends along an axial length of each half shell pair to allow thermal expansion of the half shells during heating, the first and second half shells extending in parallel planes and enclosing the plurality of electrical energy storage cells, each half shell comprising an interior layer of thermally conductive material that is shaped to conform to a cylindrical portion of an outer surface of the electrical energy storage cells, the interior layer terminating at interior layer ends that are on the cylindrical portion of the outer surface of the electrical energy storage cells, and the interior layer having a first thickness and a first value of thermal conductivity;

a plurality of outer elastic layers extending around pairs of opposed first and second half shells configured to hold pairs of first and second half shells against a respective energy storage cell, the plurality of outer elastic layers of a thermally insulating material having a thermal conductivity which is less than the thermal conductivity of the interior layer, wherein the outer layers define an exterior surface of the enclosure of the electrical energy storage cell which separates the electrical energy storage cell from the explosive environment, the outer layers having a second thickness and a second value of thermal conductivity; and the first and second thicknesses and the first and second values of thermal conductivity conforming the enclosed electrical energy storage cells to a combustible atmosphere temperature classification that specifies an outer surface temperature during an electrical short circuit of an electrical energy storage cell, the enclosure controlling the outer surface temperature of the combined enclosure and electrical energy storage cells such that the temperature regulated, enclosed electrical energy storage cell pack comprises intrinsically safe equipment in the explosive environment;

a protective device including a fusible link coupled to a connected lead and the electrical storage cells which is encased in potting compound;

an outer shell covering the plurality of electrical energy storage cells and coupled to the plurality of elongate separation bars wherein the plurality of elongate separation bars extend from the outer shell and slide between the electrical interconnects and the ends of pairs of adjacent electrical energy storage cells;

wherein an exterior temperature of the outer layer is less than 130° C. during the electrical short circuit of the electrical energy storage cell; and wherein the protective device is positioned within the outer shell and adjacent an end of one of the plurality of electrical energy storage cells.

2. The temperature regulated, enclosed electrical energy storage cell pack of claim 1 wherein the electrical energy storage cell produces heat at a hot spot during the short circuit and the interior layer of material spreads flow of the heat over a portion of the outer surface of the interior layer that is larger than the hot spot and the outer layer of material retards flow of the heat to an outer surface of the outer layer.

3. The temperature regulated, enclosed electrical energy storage cell pack of claim 1 wherein the temperature of the outer surface of the outer layers has a measured maximum temperature of 130 degrees centigrade or less during the short circuit condition.

4. The temperature regulated, enclosed electrical energy storage cell pack of claim 1 wherein the interior layer of material comprises aluminum.

5. The temperature regulated, enclosed electrical energy storage cell pack of claim 1 wherein the interior layer of material comprises copper.

6. The temperature regulated, enclosed electrical energy storage cell pack of claim 1 wherein the outer layers comprise heat-shrink tubing.

* * * * *